June 6, 1967 — A. R. SEGAL — 3,323,567
CONE HOGGER AND TRIM SAW UNIT
Filed April 7, 1965

Inventor
Arthur R. Segal

United States Patent Office 3,323,567
Patented June 6, 1967

3,323,567
CONE HOGGER AND TRIM SAW UNIT
Arthur R. Segal, Jasper, Ind., assignor to North American Products Corporation, Jasper, Ind., a corporation of Indiana
Filed Apr. 7, 1965, Ser. No. 446,335
8 Claims. (Cl. 144—223)

This invention relates to circular saws and has more particular reference to refuse saws such as are commonly termed hogging cutters.

Refuse saws or hogging cutters are used on wood sawing machines for the purpose of reducing offal or discard material to sawdust so that it can be disposed of through the air exhaust systems commonly employed for the removal or sawdust from such machines.

In the sawing of plywood panels, for example, it is usually necessary to accurately cut or trim the panels to size, and this invariably involves removal of a strip of excess or waste material from one or both edges of the panel. Relatively narrow circular trim saws are used for this purpose due to their ability to effect a smooth and accurate cut. A refuse or hogging cutter, when used conjunctionally with a trim saw under the conditions outlined, must be sufficiently wide to act upon the entire strip of excess material and saw or chop it into relatively small particles that can be readily sucked into the air exhaust shroud adjacent to the trim saw.

In the past, various designs of refuse or hogging cutters have been proposed, but all have been objectionable for one reason or another. In early hogging cutter designs, cutting over a wide kerf was achieved either by forming an undulatory toother peripheral portion on the saw blade, or by twisting each of several radially relieved and toothed peripheral portions of the blade to dispose them at acute angles to a plane normal to the axis of blade rotation, much like the blades of a fan.

Needless to say, the teeth of hogging cutters made in this fashion were exceedingly difficult to sharpen. Moreover, such cutters were not suited for operation at the high feed rates of modern wood sawing machines. The very limited numbers of teeth traveling in the same orbits required each tooth to take such a large bite that the feed rate had to be held at a value low enough to keep the cutting load compatible with the tool. Nor could the teeth of refuse saws of this type be provided with tungsten carbide cutting tips, as are the teeth of modern saws, due to the extreme difficulty of grinding the tips of successive teeth at different axial as well as circumferential locations.

In a more satisfactory refuse or hogging cutter design currently in use, a wide hogging cutter is fastened to one axial face of a narrow trim saw blade slightly larger in diameter than the hogging cutter. The teeth of the hogging cutter, which are carbide tipped, are of uniform diameter and extend uninterruptedly across the full width of the cutter. They are also set on a helix angle to improve and ease their cutting action.

While this latter type of hogging cutter is more or less satisfactory for cutting some of the stronger grain woods in the direction of the grain, it is unacceptable for cutting across the grain, particularly where the fibre structure of the wood is weaker and incapable of withstanding the substantial forces imposed thereon during cutting. The wide and comparatively few teeth of this type of cutter create great cutting forces and pressures on the material that tend to break it off ahead of the trim saw and beyond the face thereof remote from the hogging cutter, especially when approaching the end of the cut. In addition, the teeth of such hogging cutters impose relatively high impact forces which tend to create vibration in the work piece being sawed, which vibration is transmitted to the sawing machine and the trim saw blade itself with the result that the quality and accuracy of the cut surface finish suffers.

In general, it is the purpose of this invention to overcome the objections noted above through the provision of an improved refuse saw or hogging cutter which may be used either conjunctionally with a trim saw or without.

More specifically, it is a purpose of this invention to provide a circular refuse saw featuring a cutting surface comprising a number of concentric axially adjacent cutting edges the diameters of which increase stepwise toward one axial end of the cutter and the free edge of the discard material being acted upon by the cutter, and each of which cutting edges comprises a substantial number of carbide tipped saw teeth having an axial dimension only a fraction of that of the whole cutting surface.

A desirable attribute of a hogging cutter such as described, is that it will cut with substantially reduced cutting forces and pressures at each of its cutting edges and with greatly reduced impact forces due to the relatively narrow kerf sawed by the teeth on each of its cutting edges.

In this respect, it is another purpose of the invention to still further reduce impact forces and cutting pressures through the provision of a hogging cutter or refuse saw of the character described wherein the saw teeth on the different cutting edges are equal in number and in such circumferentially staggered relationship that no two teeth enter the discard material being cut thereby at the same instant.

Still another purpose of this invention is to provde a circular trim saw and hogging cutter unit wherein the trim saw is located at one axial face of the unit and has the greatest number of saw teeth, and wherein the cutting surface of the hogging cutter is comprised of a number of toothed concentric cutting edges which are axially adjacent to one another and to the trim saw, and the diameters of which cutting edges are greater than that of the trim saw and increase stepwise toward the axial end of the unit remote from the trim saw.

With the above and other objects in view which will appear as the description proceeds, this invention resides in the novel construction, combination and arrangement of parts substantially as hereinafter described and more particularly defined by the appended claims, it being understood that such changes in the precise embodiments of the herein disclosed invention may be made as come within the scope of the claims.

The accompanying drawing illustrates two complete examples of the physical embodiments of the invention, constructed according to the best modes so far devised for the practical application of the principles thereof, and in which.

Figure 1:
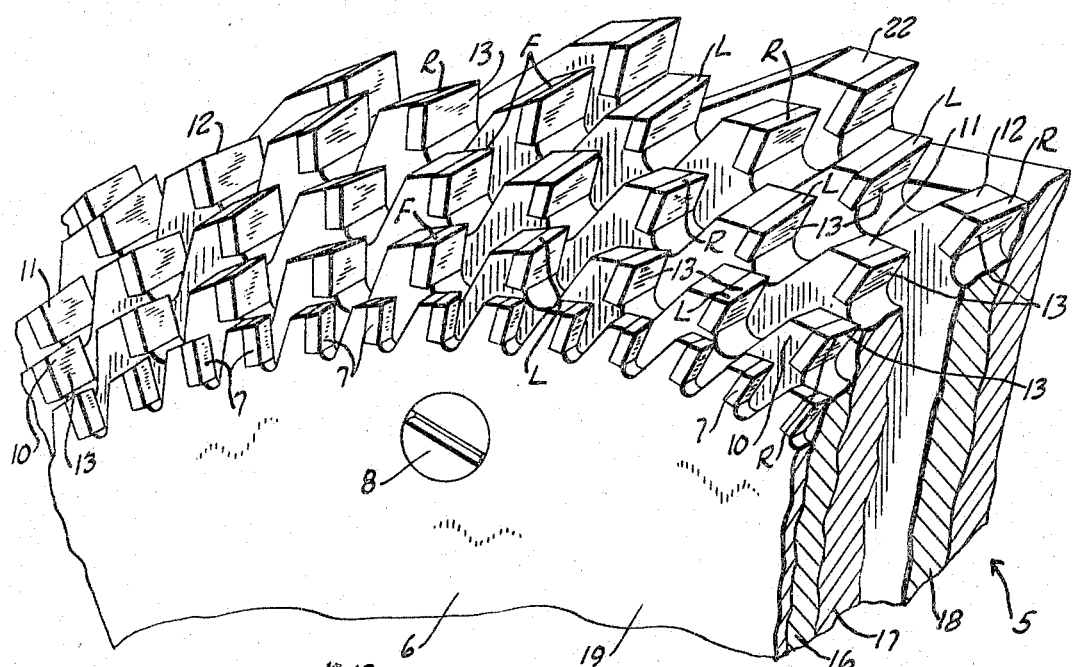
FIGURE 1 is a perspective view of a peripheral portion of a combined circular trim and refuse saw unit of this invention.

Referring now to the accompanying drawings, the numeral 5 generally designates the body of the circular refuse saw or hogging cutter of this invention. As herein shown, the refuse saw is secured to one flat face of a more or less conventional circular trim saw blade 6 having carbide tipped cutting teeth 7 equispaced along its periphery. A plurality of screws 8 can be employed as one expedient to satisfactorily hold the trim and refuse saws together as a unit having a common bore 9 to provide for mounting the unit on an arbor or other power driven shaft, not shown.

In general, the circular refuse saw or hogging cutter of this invention is characterized by a number of peripheral cutting edges all of which are concentric to the bore 9 but are larger in diameter than the cutting edge of the trim saw. The diameters of these cutting edges increase, stepwise in one axial direction, namely away from the trim saw. In most cases, three such peripheral cutting edges 10, 11 and 12 will suffice, the edge 10 having the smallest diameter and being closest to the trim saw, and the edge 12 having the largest diameter and being farthest from the trim saw.

The cutting edges 10, 11 and 12 are defined by equal numbers of saw teeth having carbide cutting tips 13 which are substantially uniformly circumferentially spaced apart. The carbide tipped teeth on each edge, however, are fewer in number than the teeth on the trim saw. The teeth on the cutting edge 10 are preferably slightly wider than the teeth 7 on the trim saw. Similarly, the teeth on the cutting edge 11 are preferably slightly wider than those on the edge 10, and the cutting edge 12 is comprised of teeth wider than those on either of the edges 10 and 11.

The cutting edges 10, 11 and 12 may be formed on flat body discs 16, 17 and 18, which collectively define the body 6 of the unit. Hence, the refuse saw may be considered as comprising a stack of coaxial circular saw blades, the diameters of which increase stepwise from one axial face of the stack to the other. In addition, the body of each blade in the stack has a thickness which is greater than that of the adjacent smaller diameter blade. The body 19 of the trim saw blade has least thickness.

Figure 2:
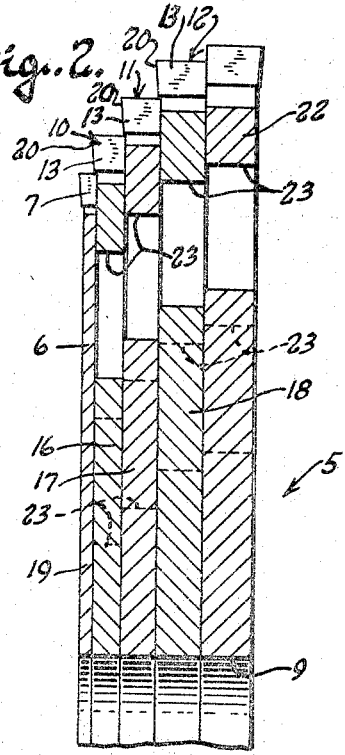
FIGURE 2 is a sectional view taken through FIGURE 1, at a slightly reduced scale and of somewhat diagrammatic nature in that it disregards the staggered relation of the saw teeth on the several cutting edges of the unit and shows the faces of the teeth as though they were in axial register.

As shown best in FIGURE 2, the trim and refuse saw blades can be secured together with their adjacent faces in intimate flatwise engagement. To permit this disposition of the blades, the carbide tips on the smaller diameter blade of each pair of adjacent blades are ground so as to have their side edges flush with that face of the blade which is to be flatwise engaged with the larger diameter blade.

In the refuse saw illustrated, the increases in diameters of the different cutting edges on the refuse saw are sufficient to enable the carbide cutting tip on each larger blade to be located entirely outwardly of the cutting tips on the teeth of the adjacent smaller diameter blade. Also, the carbide cutting tips on each cutting edge have been shown as projecting laterally from their blade toward the trim saw, as at 20, to provide side clearance for their blade during sawing. Thus, the laterally projecting teeth on each blade overlie a small portion of the teeth on the adjacent smaller diameter blade.

Figure 3:
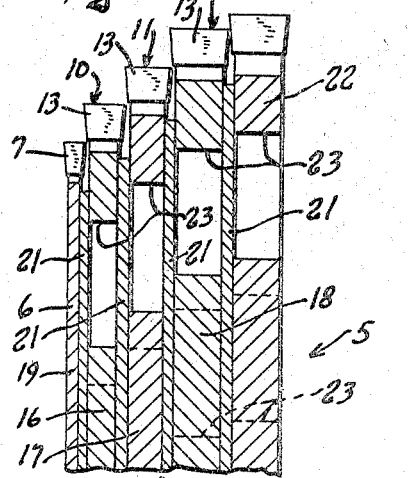
FIGURE 3 is a view similar to FIGURE 2 but showing a slightly modified embodiment of the invention.

If desired, the refuse saw may be comprised of individual saw blades having carbide cutting tips on their teeth which project laterally beyond the opposite faces of their saw bodies, as seen in FIGURE 3, in which case appropriate spacer discs 21 are interposed between adjacent blades to achieve substantially the same relationship between the cutting edges as described previously.

One or more filler blades, such as indicated at 22 in FIGURES 2 and 3, can be secured to the large diameter end of the stack of refuse cutting blades, to increase the effective cutting width of the refuse saw, depending upon the width of the discard material to be acted upon. These filler blades can be of the same diameter as the largest blade of the stack, or they can be slightly larger, as shown. All of the filler blades, however, can be of the same diameter due to their distance from the trim saw blade, and for this reason the filler blades need not have as many teeth as the refuse blades.

Holes 23 can be formed in the bodies of the refuse and filler blades to reduce the weight of the unit.

One of the features of the refuse saw of this invention is that it is provided with many more teeth than past refuse saws or hogging cutters, with the teeth narrower and distributed over a plurality of cutting edges of different diameters. This desirably cuts down the loading on each tooth of the unit, and tends to minimize cutting pressures and impact forces, and to eliminate objectionable vibration during use of the saw. Further substantial reductions in cutting pressures and impact forces can be achieved by circumferentially staggering the teeth on the cutting edges 10, 11 and 12 so that no two teeth thereof enter the discard material simultaneously.

It also eases the cutting action if alternate top bevels are ground on the carbide cutting tips on each cutting edge of the saw. By way of example, the teeth on each of the cutting edges 10, 11 and 12 can be arranged in successive groups of five circumferentially adjacent teeth, the first and third teeth of which have their tips 13 ground with a right hand top bevel R, while the second and fourth teeth have their tips 13 ground with a left hand top bevel L. The fifth tooth of each group can have its tip 13 ground to provide a flat topped raker F. The rakers, as is customary, have their flat cutting edges arranged to travel in an orbit slightly smaller in diameter than the orbits of travel of the outer corners on the top beveled tips.

The teeth of the trim saw can have their carbide tips bevel ground similarly, but it does not necessarily need raker teeth.

When in use, the combined trim and refuse saw unit is driven at substantially high speed, and a panel to be trimmed is fed into the saw in a conventional manner with the trim line in register with the trim saw blade. Sawing engagement is initially established between the cutting edge 12 on the largest diameter refuse blade, or between the filller blades 22 and the extreme edge portions of the panel discard material outside of and remote from the trim line. As sawing progresses, the cutting edges 11, and 10, and finally the teeth 7 of the trim saw are successively brought into cutting engagement with the discard material.

Each of the refuse blades, in turn, acts upon a more or less localized portion of the discard material, and the refuse cutting pressures are not concentrated upon a large area of the discard material directly laterally adjacent to the finish cut being made by the trim saw, as is the case with conventional refuse cutters presently in use. Instead, the refuse cutting pressures are relatively widely distributed over several small areas located different radial distances ahead of the trim saw teeth and also located different axial distances outwardly of the finish cut being made by the trim saw. Moreover, these cutting pressures diminish with the decreasing diameters of the cutting edges on the refuse saw, namely toward the finish cut being made by the trim saw, because of the narrowing of the saw teeth in that direction. This has the advantage of eliminating those high localized forces which hitherto tended to tear out chunks of the material being sawed at the leaving side of the cut, or to break away the material ahead of and inside the trim line, especially near the end of the cut being made by the trim saw.

From the foregoing description, together with the accompanying drawing, it will be apparent that this invention provides a circular refuse saw which is unique in that it is characterized by a number of substantially narrow cutting edges which decrease in width and in diameter away from the free edge of a discard strip being acted upon by the saw so as to achieve step sawing with cutting pressures that correspondingly decrease with the distance from the free edge of the discard strip, to thereby greatly improve the action of the saw and minimize or even prevent tear out of material at the leaving side of the cut and breaking away of the material as the end of the cut is approached.

What is claimed as my invention is:

1. A combination circular refuse and trim saw unit, characterized by:

(A) a group of axially juxtaposed flat saw blades, comprising
  (1) a trim saw blade,
  (2) a plurality of refuse cutters larger in diameter than the trim saw blade and coaxially fixed to one axial face thereof,
  (3) and the refuse cutters increasing in diameter stepwise with their axial distance from the trim saw blade.

2. The combination circular refuse and trim saw unit of claim 1, wherein the refuse cutters all have teeth that are wider than those on the trim saw blade, and each refuse cutter more distant from the trim saw blade than an adjacent refuse cutter having teeth wider than those on said adjacent refuse cutter.

3. A combination circular refuse and trim saw unit, characterized by:
  (A) a body having a central bore and having
    (1) a circle of trim saw teeth arranged to travel in a first orbit concentric to the bore,
    (2) and a plurality of other circles of saw teeth adapted for refuse cutting and arranged to travel in orbits which are concentric to the bore, larger in diameter than said first orbit, and axially adjacent to one another and to one side of the circle of trim saw teeth, the diameters of said other circles of teeth increasing stepwise with their distance from the circle of trim saw teeth.

4. The combination circular refuse and trim saw unit of claim 3, wherein the saw teeth in said other circles thereof are staggered circumferentially of the body so as to be axially misaligned around the entire periphery of the body.

5. The combination circular refuse and trim saw unit of claim 3, wherein all of said other circles have the same number of saw teeth; and wherein the saw teeth in said other circles thereof are staggered circumferentially of the body so that no two saw teeth in said other circles enter work being sawed at the same instant.

6. A combination circular refuse and trim saw unit, characterized by:
  (A) a number of flat circular saw blades assembled in a stack;
  (B) the saw blade at one end of the stack comprising a trim saw having a large number of substantially narrow circumferentially spaced teeth;
  (C) all of the remaining saw blades comprising refuse cutters which are larger in diameter than the trim saw blade and having fewer but wider circumferentially spaced teeth;
  (D) and said refuse cutters increasing stepwise in diameter toward the opposite end of the stack.

7. The combination circular refuse and trim saw unit of claim 6, wherein the teeth of each refuse cutter more distant from the trim saw than an adjacent refuse cutter have greater width than said adjacent refuse cutter.

8. The combination circular refuse and trim saw unit of claim 7, wherein the teeth of the refuse cutters are circumferentially staggered so that no two teeth thereof enter work being sawed at the same instant.

References Cited

UNITED STATES PATENTS

| | | | |
|---|---|---|---|
| 1,862,681 | 6/1932 | Johnson | 144—237 |
| 2,632,487 | 3/1953 | Davidson | 144—133 |
| 3,027,106 | 3/1962 | Brooks | 241—294 |
| 3,212,724 | 10/1965 | Henderson | 241—277 |

FOREIGN PATENTS

| | | |
|---|---|---|
| 1,148,061 | 5/1963 | Germany. |
| 1,159,622 | 12/1963 | Germany. |
| 1,198,042 | 8/1963 | Germany. |

WILLIAM W. DYER, Jr., *Primary Examiner.*
R. J. ZLOTNIK, *Assistant Examiner.*